E. G. TIDLUND.
BEARING.
APPLICATION FILED OCT. 11, 1913.
1,231,670.
Patented July 3, 1917.
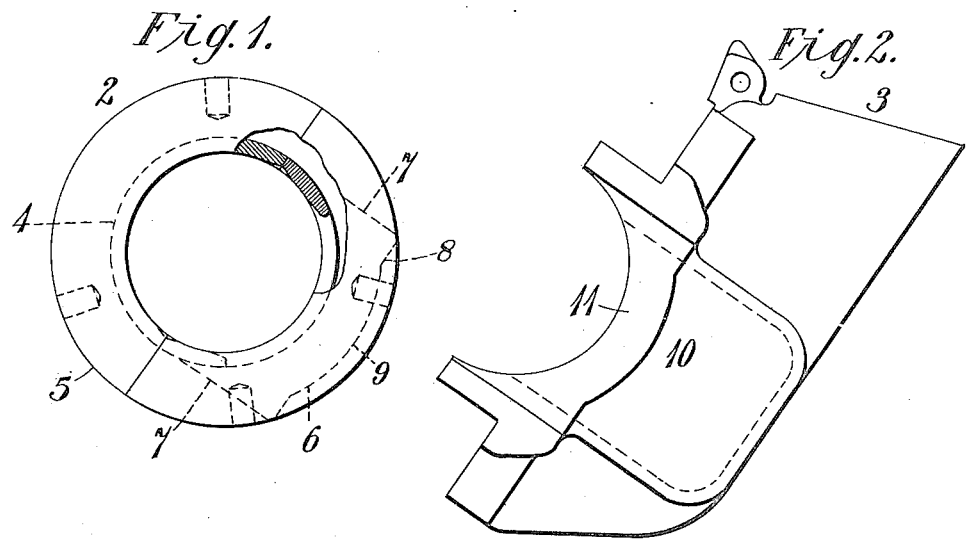
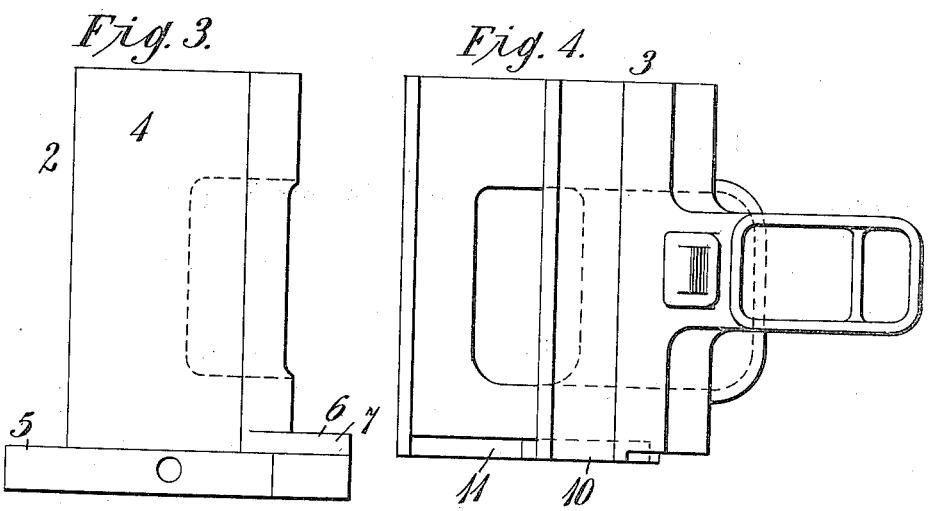
WITNESSES:
Fred H. Miller
W. R. Coley
INVENTOR
Edwin G. Tidlund
BY
Wesley G. Carr
ATTORNEY

UNITED STATES PATENT OFFICE.

EDWIN G. TIDLUND, OF PITTSBURGH, PENNSYLVANIA, ASSIGNOR TO WESTINGHOUSE ELECTRIC AND MANUFACTURING COMPANY, A CORPORATION OF PENNSYLVANIA.

BEARING.

1,231,670.     Specification of Letters Patent.     Patented July 3, 1917.

Application filed October 11, 1913. Serial No. 794,615.

*To all whom it may concern:*

Be it known that I, EDWIN G. TIDLUND, a subject of the King of Sweden, and a resident of Pittsburgh, in the county of Allegheny and State of Pennsylvania, have invented a new and useful Improvement in Bearings, of which the following is a specification.

My invention relates to shaft or axle bearings and housings therefor, and it has for its object to provide a bearing and housing which shall be simple, rugged and inexpensive in construction and reliable and effective in operation.

In the prior art, various devices have been employed for positioning the bearings of shafts or axles in their housings or axle-caps to prevent the bearings from turning. For example, keys and dowel pins have been employed, but not altogether satisfactorily, since, in operation, such positioning devices have not always been as rugged or as effective as might be desired.

According to my invention, I provide a strong and effective positioning means comprising a relatively large partial flange disposed just within the ordinarily flanged end of the bearing, which flange is adapted to make a finished fit within a corresponding seat in a wall of the housing or axle-cap.

In the accompanying drawing, Figures 1 and 2 are views in end elevation of an axle bearing and a portion of an axle-cap, respectively, that are constructed in accordance with my invention, the views being shown separated, for purposes of clearness; and Figs. 3 and 4 are similarly separated views, in side elevation, of the devices shown in Figs. 1 and 2, respectively.

Referring to the drawing, the apparatus shown comprises a shaft bearing 2, and a supporting housing or axle-cap 3 for the bearing. The bearing and housing are shown as being of the split type; it will be understood, however, that my invention is not limited to any particular type of bearing but is capable of ready adaptation to other types than the particular one shown.

The bearing 2 comprises a cylindrical body member 4, an outwardly-extending flange 5 at one end and a projection or partial flange 6 located just within and adjacent to the flange 5. The flange 6 preferably does not extend beyond the periphery of the flange 5 and is bounded by two finished edge surfaces 7 that are respectively disposed tangentially to the cylindrical member 4 at diametrically opposite points and, therefore, are substantially parallel to each other, and a connecting end surface 8 disposed substantially at right angles to the surfaces 7 and having a centrally disposed rounded protuberance 9. The exposed face of the flange 6 and the edge surfaces 7 are finished, for a purpose hereinafter specified.

The housing 3, of any suitable construction for supporting the bearing 2, is provided in one external wall 10, with an externally disposed and relatively shallow seat 11 having a finished face and finished edge surfaces to correspond exactly with the respective finished surfaces of the partial flange 6.

The correlations of the various members will be readily understood from the foregoing description. By reason of the finished fit of the partial flange 6 within the seat 11 in two planes at right angles, a permanently reliable means is provided for properly positioning the bearing and preventing it from turning within the housing, all possibility of a chattering or working loose of parts being eliminated.

It will be understood that various modifications of the apparatus herein set forth may be made within the spirit and scope of my invention; I, therefore, desire that only such limitations shall be imposed as are indicated in the appended claims.

I claim as my invention:

1. The combination with a shaft or axle bearing provided with an external end flange and a partial integral flange located entirely within said end flange, of a housing having a seat in an external wall adapted to inclose said partial flange and position said bearing.

2. The combination with a shaft or axle bearing provided with an external end flange and a partial integral flange located entirely within said end flange and having a plurality of finished surfaces, of a housing having a seat formed in an external wall and having a plurality of finished surfaces for rigidly engaging the respective finished surfaces of said partial flange and positioning said bearing.

3. The combination with a shaft or axle bearing provided with an external end flange and a partial integral flange disposed in proximity thereto and having a finished face surface and a plurality of finished end surfaces severally disposed at an angle thereto, of a housing for said bearing having a seat formed in an external wall and having a plurality of finished surfaces for rigidly engaging the respective finished surfaces of said partial flange.

4. The combination with a shaft or axle bearing provided with an external end flange and a partial integral flange disposed in proximity thereto, the said flange being bounded by substantially parallel edge surfaces and a connecting end surface having portions thereof at right angles to said edge surfaces, of a housing for said bearing having a seat formed in an external wall, the said seat having substantially parallel side walls and a bottom having portions thereof at right angles to said walls for engaging the respective surfaces of the said partial flange.

In testimony whereof, I have hereunto subscribed my name this 10th day of Oct., 1913.

EDWIN G. TIDLUND.

Witnesses:
W. R. BELL,
B. B. HINES.

Copies of this patent may be obtained for five cents each, by addressing the "Commissioner of Patents, Washington, D. C."